United States Patent Office 2,802,839
Patented Aug. 13, 1957

2,802,839
PREPARATION OF 3-KETOPREGNENES
Howard J. Ringold, Franz Sondheimer and George Rosenkranz, Mexico City, Mexico, assignors to Syntex S. A., Mexico City, Mexico, a corporation of Mexico No Drawing. Application December 29, 1953,
Serial No. 401,058
Claims priority, application Mexico January 13, 1953
9 Claims. (Cl. 260—397.4)

The present invention relates to a novel method for the preparation of cyclopentanophenanthrene derivatives and to certain novel intermediates for the preparation thereof.

More particularly the present invention relates to the preparation of $\Delta^4$-pregnen-17$\alpha$-21-diol-3,20-dione (Reichstein's substance S) from the known compound $\Delta^5$-pregnen-3$\beta$,17$\alpha$-diol-20-one (17-hydroxy-pregnenolone). In addition, the present invention relates to a novel process for the production of steroidal 3-ketones from the corresponding steroidal 3-formates involving the treatment of the 3-formates with an aluminum alkoxide in the presence of a hydrogen acceptor.

Reichstein's substance S, a known cortical hormone, is not only of therapeutic importance in itself, but is also an important intermediate compound since it constitutes an ideal starting material for the microbiological introduction of an oxygen function at position C-11 of the steroid molecule. Thus it is known that incubation of Reichstein's substance S under oxidizing conditions with certain microorganisms produces in a single step the known adrenal hormone, Kendall's compound F or 17-hydroxycorticosterone. A number of processes are known for the production from various compounds of the aforementioned Reichstein's substance S, however, for the most part most of these known processes possess several disadvantages and/or involve difficulties in certain other steps thereof.

In accordance with the present invention there has been discovered a novel process for the production of substance S starting with the 17-hydroxy pregnenolone and involving production of the corresponding 3-formate thereof, bromination of the formate, treatment of the tribromo compound with sodium iodide to produce the 3-monoformate of 21-iodo-$\Delta^5$-pregnen-3$\beta$,17$\alpha$-diol-20-one, conversion of this last-mentioned compound to the corresponding 3-formate 21-acetate, further acetylation at position 17 to form the corresponding 3-formate 17,21-diacetate and finally the Oppenauer oxidation of the formate, either directly to the 17,21-diacetate of Reichstein's substance S or with prior selective saponification to the 3 alcohol. There has further been discovered in accordance with the present invention a novel Oppenauer oxidation of 3-formoxy compounds producing in a single step the corresponding 3-keto compound. The present invention further involves the production of certain novel 3-formoxy intermediates.

The following equation illustrates a portion of the process of the present invention:

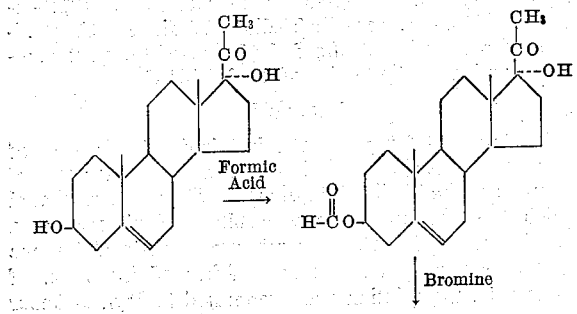
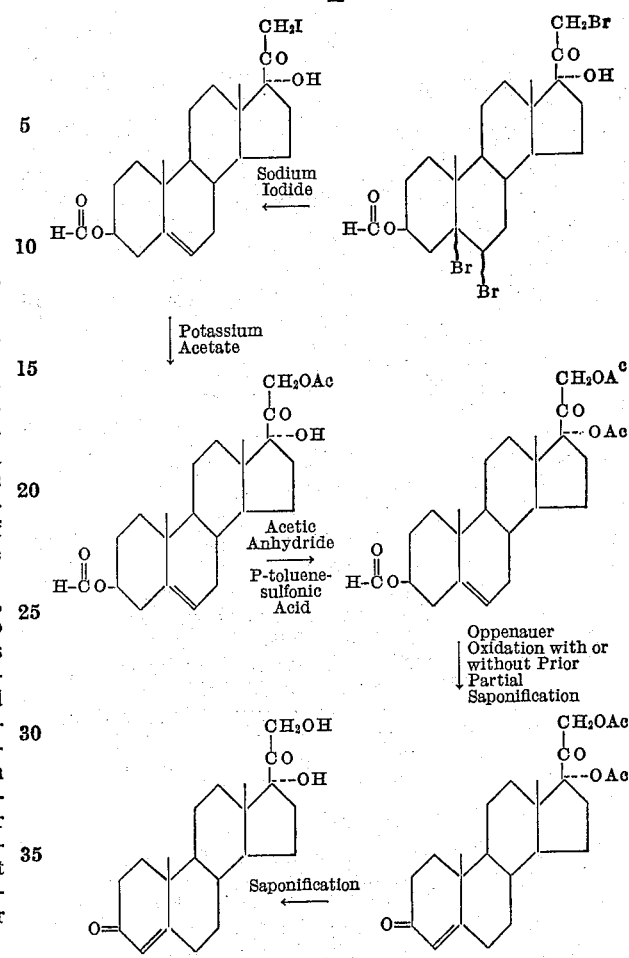

Although in the above equation the designation Ac represents the acetyl group, it may be understood that if other lower fatty acid compounds are utilized in place of potassium acetate, and/or other anhydrides in place of acetic anhydride, that compounds will be produced having a lower fatty acid acyl group in positions 17 and 21 in place of the acetyl group.

Referring to the foregoing equation, the process of the present invention may be practiced in general by suspending $\Delta^5$-pregnen-3$\beta$,17$\alpha$-diol-20-one (17-hydroxypregnenolone) in concentrated formic acid and shaking the same for a substantial period of time at an elevated temperature, as for example for two hours at a temperature of 70° C. After cooling the corresponding 3-formate precipitates and can be filtered and recrystallized. The 3-formate produced as a result of the first step of the above-outlined process can then be treated with bromine, preferably somewhat less than 3 molar equivalents being used, in the presence of an organic solvent such as anhydrous chloroform or ethylene dichloride. Mild bromination conditions are utilized, such as room temperature and the mixture kept under anhydrous conditions until the color of the bromine has disappeared. There is thereupon produced the 3-monoformate of 5,6,21-tribromo pregnane-3$\beta$,17$\alpha$-diol-20-one. The tribromo compound without purification can then be dissolved in a suitable ketone solvent such as acetone and mixed with sodium iodide to reconstitute the double bond at the C-5 position and produce the corresponding unsaturated 21-iodo compound. This compound can then be treated with a potassium lower fatty acylate such as potassium acetate to prepare the corresponding 21-lower fatty acid ester.

The 21-lower fatty acid ester is then treated with a lower fatty acid acetylating agent such as acetic anhydride in the presence of a strong acid such as halogen acid or a strong organic acid as for example p-toluenesulfonic acid. As a result of these last steps there is produced the 3-formate 17α-21-lower fatty diacylate of Δ⁵-pregnen-3β,17α-21-triol-20-one.

The 3-formate, 17,21-diacylate can then be either partially saponified by treating the same with hydrochloric acid to prepare the 17,21-diacylate or the 3-formate can be directly treated with an aluminum alkoxide in the presence of a hydrogen acceptor (Oppenauer oxidation). By partial saponification, there is produced the diacetate of Δ⁵-pregnen-3β,17α,21-triol-20-one and either this compound or the 3-formate can be treated to produce the corresponding 17,21-diacetate of Reichstein's substance S, i. e. Δ⁴-pregnen-17α,21-diol-3,20-dione.

The Oppenauer oxidation of the formate directly is preferred since it does away with the necessity for performing a partial saponification. This particular step although illustrated in the equation with a particular formate is generally applicable to other steriods having the 3-formoxy group. For the Oppenauer oxidation on the formate the usual aluminum alkoxides customarily used for this purpose for steroid oxidations may be utilized, as for example, aluminum isopropylate. An inert solvent is also present such as xylene or toluene together with hydrogen acceptor preferably a ketone such as cyclohexanone.

The diacetate or other lower fatty diacylate of Reichstein's substance S produced in accordance with the previously described steps may be saponified either by means of an acid or base to prepare the corresponding substance S as will be hereinafter set forth in detail.

The following specific examples serve to illustrate but are not intended to limit the present invention:

Example I

A suspension of 90 g. of Δ⁵-pregnene-3β,17α-diol-20-one in 2300 cc. of 85% formic acid was shaken for two hours at a temperature of 70° C. During this time the compound partially dissolved and at the same time a new crystalline substance appeared in the solution. After cooling, the precipitate was filtered, thus giving 80 g. of the 3-formate of Δ⁵-pregnen-3β,17α-diol-20-one having a melting point of 204°–207° C. $[\alpha]_D$—61° (chloroform).

Addition of water to the mother liquors gave a precipitate which after saponification with methanolic potassium hydroxide afforded 4.92 g. of recovered 17-hydroxy-pregnenolone with melting point 264°–267° C.

Example II

A solution of 5 g. of the 3-formate of Δ⁵-pregnen-3β,17α-diol-20-one in 100 cc. of anhydrous chloroform free of alcohol (100 cc. of anhydrous ethylene dichloride can be used instead of chloroform) was treated in the course of approximately 10 minutes with a solution of 2.05 to 2.2 molar equivalents of bromine in 50 cc. of the same solvent. The mixture was kept under anhydrous conditions at room temperature until the color of bromine had disappeared. The solution was then washed with sodium bicarbonate solution and water, dried over sodium sulfate and concentrated to dryness under vacuum, thus giving the 3-monoformate of 5,6,21-tribromo-pregnan-3β,17α-diol-20-one having a melting point of 143°–146° C. (the analytical sample had a melting point of 151°–153° C., $[\alpha]_D$—34°).

The crude tribromo compound was dissolved in 70 cc. of anhydrous acetone and mixed with a solution of 20 g. of sodium iodide in 70 cc. of anhydrous acetone. The mixture was kept at room temperature for 20 hours, and then poured into an aqueous solution of sodium thiosulfate and filtered. The compound was air dried, dissolved in 100 cc. of anhydrous acetone and refluxed for eight hours with 25 g. of anhydrous potassium acetate. The solution was evaporated to dryness, diluted with water and the precipitate was filtered and washed with water. The dry product was crystallized from methanol to give 3.55 g. of the 3-formate 21-acetate of Δ⁵-pregnen-3β,17α,21-triol-20-one having a melting point of 199°–200° C., $[\alpha]_D$±0° (chloroform).

Example III 0.85 g. of p-toluenesulfonic acid was added to an acetic anhydride solution of 2.5 g. of the compound obtained in accordance with Example II and the mixture was shaken for 9 hours at room temperature. The precipitate was collected, giving 1.05 g. of crystals. The filtrate was poured into water and kept standing until the excess of acetic anhydride had decomposed and the precipitate was filtered and crystallized from acetone-hexane, thus giving 1.26 g. of crystals identical to the 1.05 g. obtained by direct filtration.

The total yield of the 3-formate 17,21-diacetate of Δ⁵-pregnen-3β,17α,21-triol-20-one was 2.31 g., having a melting point of 214°–218° C., $[\alpha]_D$—60° (chloroform).

Example IV

A solution of 8 g. of the 3-formate 17,21-diacetate of Δ⁵-pregnen-3β,17α,21-triol-20-one in 240 cc. of dioxane was treated with a mixture of 8 cc. of concentrated hydrochloric acid and 48 cc. of water. The resulting suspension was shaken for 8 hours, poured into water, cooled overnight in the refrigerator and filtered. 7.35 g. was obtained of the 17,21-diacetate of Δ⁵-pregnen-3β,17α,21-triol-20-one having a melting point of 189°–196° C. Crystallization from acetone-hexane gave 6.52 g. with melting point 197°–201° C. (the analytical sample had a melting point of 197°–201° C., $[\alpha]_D$—59° (chloroform).

Example V 1.0 g. of the diacetate of Δ⁵-pregnen-3β,17α,21-triol-20-one, obtained in accordance with Example IV, was dissolved in 60 cc. of toluene and 20 cc. of cyclohexanone and 5 cc. of solvent was distilled in order to remove traces of moisture. A solution was added of 2 g. of aluminum isopropylate in 4.6 cc. of toluene and the mixture was refluxed for 90 minutes, cooled and diluted with water. The organic solvents were removed by steam distillation and the product was filtered, dried and extracted with hot acetone. The 17,21-diacetate of Δ⁴-pregnen-17α,21-diol-3,20-dione crystallized from acetone-hexane, thus yielding 0.74 g. with a melting point of 207°–212° C. (The analytical sample had a melting point of 214°–216° C., $[\alpha]_D$+74°, λ max. 240 mμ, log ε. 4.22.)

Alternatively, 94.6 g. of the 3-formate 17,21-diacetate of Δ⁵-pregnen-3β,17α,21-triol-20-one, obtained in accordance with Example III, was dissolved in 2840 cc. of xylene and 280 cc. of solvent was distilled in order to remove traces of moisture. 950 cc. of cyclohexanone was added and a further 280 cc. of the mixture was distilled. 95 g. of aluminum isopropylate was added to the hot solution and the mixture was refluxed for 45 minutes. Water was added to the mixture previously cooled to 90° C. and the organic solvents were removed by steam distillation. Salt was added to the aqueous suspension and the solid precipitate was filtered, dried at 90° C. and extracted with 3 lt. of hot acetone. The acetone solution was evaporated to dryness, leaving as a residue the crude 17,21-diacetate of Δ⁴-pregnen-17α,21-diol-3,20-dione. Crystallization from methanol afforded 62.4 g. of the pure compound with a melting point of 211°–216° C.

Example VI

A solution of 0.5 g. of potassium hydroxide in 2 cc. of water was added to a solution of 1 g. of the diacetate of Δ⁴-pregnen-17α,21-diol-3,20-dione in 50 cc. of methanol which was kept under an atmosphere of nitrogen at a temperature of 10° C. The mixture was stirred for one hour at the same temperature. After adding 1 cc. of acetic acid, the solution was evaporated to dryness under vacuum. Water was added to the residue and the precipitate was dried and crystallized from acetone, thus giving 700 mg. of $\Delta^4$-pregnen-17$\alpha$,21-diol-3,20-dione with a melting point of 207°–209° C.

1 g. of the diacetate was dissolved in 50 cc. of methanol and mixed under an atmosphere of nitrogen with between one and two molar equivalents of sodium methoxide. After five minutes acetic acid was added and the product was worked up such as described in the above paragraph, thus yielding compound S with the same melting point and with the same yield.

A mixture of 1 cc. of concentrated hydrochloric acid and 9 cc. of water was added to a solution of 1 g. of the diacetate in 50 cc. of methanol and the mixture was kept for 24 hours at room temperature under continuous stirring. 2 g. of potassium acetate was added and the solution was concentrated to a small volume under vacuum. After adding water the precipitate was filtered and dried. Crystallization from acetone afforded 700 mg. of Reichstein's compound S, identical to the one obtained in accordance with the above paragraphs.

Example VII 5 g. of dehydroisoandrosterone was dissolved in 55 cc. of formic acid and the solution was kept for one hour at a temperature of 60° C. It was cooled, poured into water and the precipitate was filtered, washed to neutral and dried. There was obtained 4.8 g. of the formate of dehydroisoandrosterone, which after crystallization from acetone-hexane gave the analytical sample with a melting point of 141°–145° C., $[\alpha]_D$ —8° (chloroform).

0.5 g. of the 3-formate of $\Delta^5$-androstene-3$\beta$,17$\beta$-diol was oxidized by the method described in detail in Example VIII, and after crystallization of the product from acetone-hexane, there was obtained 270 mg. of $\Delta^4$-androstene-3,17-dione with a melting point of 167°–170° C.

Example VIII 1 g. of the 3-formate of $\Delta^5$-androstene-3$\beta$,17$\beta$-diol and 0.34 g. of p-toluenesulfonic acid was dissolved in 10 cc. of acetic anhydride and the mixture was kept for 16 hours at room temperature. The 3-formate 17-acetate crystallized directly from the reaction mixture and was filtered, washed with water and dried. There was obtained 530 mg. with a melting point of 144°–148° C.; precipitation with water of the mother liquors afforded an additional 530 mg. with lower melting point and with a purity of approximately 50%.

0.5 g. of the 3-formate 17-acetate of $\Delta^5$-androstene-3$\beta$,17$\beta$-diol was dissolved in 15 cc. of xylene, mixed with 5 cc. of cyclohexanone and 3 cc. of the solution was distilled in order to remove traces of moisture. 0.5 g. of aluminum isopropylate was then added and the mixture was refluxed for 45 minutes, cooled and diluted with water; the organic solvents were removed by steam distillation, the residue was cooled and the precipitate was filtered and dried. Recrystallization from acetone-hexane yielded 250 mg. of the acetate of testosterone with a melting point of 137°–140° C.

Example IX

Following the method described in Example VIII, except that propionic anhydride was used instead of acetic anhydride, there was obtained the 3-formate 17-propionate of $\Delta^5$-androstane-3$\beta$,17$\beta$-diol, with a melting point of 106°–109° C. in 80% yield; $[\alpha]_D$ —65° (chloroform). Starting from this compound, the propionate of testosterone was obtained in 63% yield, with a melting point of 118°–121° C.

Example X 5 g. of the 3-formate of $\Delta^5$-pregnen-3$\beta$,17$\alpha$-diol-20-one suspended in 120 cc. of acetic anhydride was treated with 1.5 g. of p-toluenesulfonic acid and the mixture was stirred for 9 hours at room temperature. It was poured into water and after 2 hours standing, the precipitate was filtered and washed to neutral, thus yielding the 3-formate 17-acetate of $\Delta^5$-pregnen-3$\beta$,17$\alpha$-diol-20-one in a yield of over 90%.

1 g. of this 3-formate 17-acetate was dissolved in 30 cc. of xylene and 10 cc. of cyclohexanone and 4 cc. of the solution were distilled in order to remove traces of moisture. 1 g. of aluminum isopropylate was added to the hot solution and the mixture was refluxed for 45 minutes. After cooling to 90° C., water was added and the organic solvents were removed by steam distillation. Salt was added to the aqueous suspension and the residue was filtered, dried and extracted with hot acetone. The acetone solution was evaporated to dryness and the residue was crystallized from chloroform-methanol, thus giving 610 mg. of the 17-acetate of $\Delta^4$-pregnen-17$\alpha$-ol-3,20-dione (17-acetoxy-progesterone) with a melting point of 239°–240° C. Saponification of this compound with 1% methanolic potassium hydroxide yielded 80% of $\Delta^4$-pregnen-17$\alpha$-ol-3,20-dione.

Example XI 7 g. of 3-formate 21-acetate of $\Delta^{5,16}$-pregnadiene-3$\beta$,21-diol-20-one dissolved in 300 cc. of xylene and 120 cc. of cyclohexanone was mixed with 6 g. of aluminum isopropylate previously dissolved in 30 cc. of xylene. After refluxing for two hours, the solution was washed with dilute hydrochloric acid and water, the organic solvents were removed by steam distillation, the residue was extracted with ether and the ether solution was dried and evaporated to dryness. The residue, weighing 6 g., was chromatographed in a column with 250 g. of activated alumina. The crystalline fractions eluted from the column with benzene were combined and recrystallized from acetone-hexane, thus affording 4.3 g. of the acetate of 16-dehydro-desoxycorticosterone with a melting point of 145°–148° C. The analytical sample had a melting point of 152°–154° C., $[\alpha]_D$+150° (chloroform), ultraviolet absorption maximum: max. 240 m$\mu$ (log $\epsilon$ 4.444).

Example XII 7 g. of the 3-formate 21-acetate of $\Delta^{5,16}$-pregnadiene-3$\beta$,21-diol-20-one dissolved in 350 cc. of toluene and 120 cc. of cyclohexanone was subjected to the treatment in accordance with the method described in Example XI. The acetate of 16-dehydrodesoxycorticosterone was obtained with the same yield and with the same characteristics as reported in Example XI.

Example VIII 10 g. of androstan-3$\beta$-ol-17-one was suspended in 250 cc. of 85% formic acid and the mixture was stirred for two hours at a temperature of 65° C. The cooled solution was poured into water, the precipitate was filtered, washed to neutral and dried. Recrystallization from acetone-hexane yielded 8.9 g. of the formate of androstan-3$\beta$-ol-17-one.

8 g. of the formate was dissolved in 300 cc. of distilled tetrahydrofurane and mixed with 3 cc. of water and 0.4 g. of sodium borohydride. The mixture was stirred for three hours at room temperature and then formic acid was added to destroy the excess of hydride. The solution was concentrated, precipitated with water and the precipitate was filtered, washed and dried. 5.8 g. was obtained of the 3-formate of androstane-3$\beta$,17$\beta$-diol.

5 g. of the 3-monoformate dissolved in 50 cc. of acetic anhydride was mixed with 1.5 g. of p-toluenesulfonic acid and kept overnight at room temperature. The 3-formate 17-acetate of androstane-3$\beta$,17$\beta$-diol crystallized directly from the reaction mixture. Filtration and purification by routine methods afforded 3.8 g. of the compound.

0.5 g. of the 3-formate 17-acetate of androstane-3$\beta$,17$\beta$-diol was dissolved in 15 cc. of xylene and 5 cc. of cyclohexanone and 3 cc. of the solution was distilled in order to remove traces of moisture. 0.5 g. of aluminum isopropylate was added and the mixture was refluxed for 45 minutes and cooled. The organic solvents were removed by steam distillation and the residue was extracted with chloroform, washed and evaporated to dryness. Recrystallization from acetone-hexane yielded 295 mg. of the 17-acetate of androstan-17β-ol-3-one (acetate of dihydrotestosterone) with a melting point of 156°–158° C.

We claim:

1. A process for the production of the lower fatty diacylate of Δ⁴-pregnen-17α,21-diol-3,20-dione which comprises treating Δ⁵-pregnen-3β,17α-diol-20-one with formic acid to form the corresponding 3-monoformate, brominating the monoformate to form the corresponding 5,6,-21-tribromo derivative, treating the tribromo derivative with sodium iodide followed by treatment with a potassium lower fatty acylate to form the 3-monoformate 21-lower fatty acylate of Δ⁵-pregnen-3β,17α,21-triol-20-one, treating the last-mentioned compound with a lower fatty acylate in the presence of a strong acid selected from the class consisting of halogen acids and strong organic acids to prepare the 3-monoformate 17,21-lower fatty diacylate of Δ⁵-pregnen-3β,17α,21-triol-20-one and thereafter forming from the last-mentioned compound the lower fatty diacylate of Δ⁴-pregnen-17α,21-diol-3,20-dione by oxidation with an aluminum alkoxide in the presence of a hydrogen acceptor.

2. The process of claim 1 wherein the lower fatty diacylates are the acetate, and are formed by treatment with potassium acetate and acetic anhydride.

3. The process of claim 1 wherein the 3-monoformate 17,21-lower fatty diacylate is subjected to partial saponification to form the corresponding 17,21-lower fatty diacylate prior to Oppenauer oxidation.

4. The process of claim 1 wherein the lower diacylate formed is further treated with a saponifying agent to form Δ⁴-pregnen-17α,21-diol-3,20-dione.

5. The process of claim 1 wherein the aluminum alkoxide is aluminum isopropylate and the hydrogen acceptor is cyclohexanone.

6. The process of claim 1 wherein the strong acid is p-toluenesulfonic acid, the lower fatty diacylates are the acetate and are formed by treatment with potassium acetate and acetic anhydride, the hydrogen acceptor is illuminum isopropylate and the hydrogen accepter is cyclohexanone.

7. A process for the production of the diacetate of Δ⁴-pregnen-17α,21-diol-3,20-dione which comprises treating the 3-formate 17,21-diacetate of Δ⁵-pregnen-3β,17α,-21-triol-20-one with an aluminum alkoxide in the presence of a hydrogen acceptor.

8. The process of claim 7 wherein the aluminum alkoxide is aluminum isopropylate and the hydrogen acceptor is cyclohexanone.

9. A process for the production of a steroidal 3-ketone of the pregnane series having the substituents

—CO—CH₂OR and . . . OR on carbon C-17 and R represents a lower fatty acyl group which comprises treating a corresponding 3-formate with an aluminum alkoxide in the presence of a hydrogen acceptor.

References Cited in the file of this patent

UNITED STATES PATENTS 2,411,172   Stavely _____ Nov. 19, 1946

FOREIGN PATENTS 536,210   Great Britain _____ May 7, 1941
236,013   Switzerland _____ May 16, 1945

OTHER REFERENCES

Shoppee, Helv. Chim. Acta 26, 1004–1016 (1943).
Julian: Jour. Am. Chem. Soc. 72, 362–366 (1950).
Jones: Jour. Am. Chem. Soc. 73, 3215–3220 (1951).
Wieland: Helv. Chim. Acta 34, 354–358 (1951).
Fieser et al.: Natural Products Related to Phenanthrene, 3rd, ed., page 425 (1949).
Fieser et al.: Natural Products Related to Phenanthrene, 3rd, ed., page 424 (1949).